United States Patent [19]
Iannini

[11] 3,768,196
[45] Oct. 30, 1973

[54] ELECTRIC FLY KILLER
[75] Inventor: Robert E. Iannini, Milford, N.H.
[73] Assignee: Rid-O-Ray Inc., Milford, N.H.
[22] Filed: Dec. 2, 1971
[21] Appl. No.: 204,235

[52] U.S. Cl. .............................................. 43/112
[51] Int. Cl. ........................................... A01m 1/22
[58] Field of Search .................... 43/112, 113, 98, 43/99

[56] References Cited
UNITED STATES PATENTS
3,491,478   1/1970   Gilbert ................................ 43/112
2,016,722   10/1935   Levin .................................. 43/112

*Primary Examiner*—Warner H. Camp
*Attorney*—Pearson & Pearson

[57] ABSTRACT

An electric fly killer is suspended near the ceiling of a room to dispense a soft fluorescent light attractive to flies. It comprises an elongated trough-like receptacle of V cross section having inclined side walls, a wide top opening and a narrow bottom opening. A detachable closure and collection tray covers the bottom opening. A black fluorescent tube imparts fluorescence to a coating on the side walls to draw flies through a pair of spaced apart, concave, electrode grids. The grids are parabolic to avoid rebound of the dead flies out of the device.

7 Claims, 4 Drawing Figures

PATENTED OCT 30 1973 3,768,196

INVENTOR.
ROBERT E. IANNINI

BY

*Pearson + Pearson*
ATTORNEYS

ELECTRIC FLY KILLER

BACKGROUND OF THE INVENTION

Electric insect killers are now well known and usually consist of a pair of spaced, upstanding, electrode grids, encircling a light source and intended to attract insects to be electrocuted between the grid electrodes. While useful for mosquitoes and outdoors, such devices are not attractive to flies and the explosion of the fragments of the electrocuted insects is objectionable, for example indoors in a home or restaurant.

Typical of such vertical grid devices with no means for preventing the fall of insect bodies is U.S. Pat. No. 1,962,420 of June 12, 1934 to Bradley.

Horizontal grid type devices are disclosed in U.S. Pat. No. 2,030,310 to McWilliams of Feb. 11, 1936, wherein a flat horizontal pair of electrode grids, over a flat horizontal sliding tray, is stated to be used in restaurants for flies, but there is no light source to attract the flies and a shock would be given a human being inadvertently closing the circuit. A similar concept is disclosed in U.S. Pat. No. 2,835,071 to Partridge of May 20, 1958, wherein there is no light source, or other means, to attract flies and the flies are expected to enter between the meshes of a pair of upstanding grids for electrocution, when the device is suspended from a ceiling.

SUMMARY OF THE INVENTION

In the electric fly killer of this invention, the device is suspended proximate the ceiling of a room because flies tend to alight on the ceiling at night where rising hot air has made the ceiling area warmer than the lower regions of the room. Flies are wary and difficult to trap unless attracted to something. The V-shaped elongated trough receptacle of this invention has inner side walls coated with a fluorescent substance which re-radiates a soft light received from the black fluorescent tube in the lower part of the device. The gentle, soft light attracts the flies down from the ceiling to pass through the meshed cover and encounter the concaved grid electrodes, whereupon the flies are electrocuted. Because the girds are parabolic, regardless of the path of approach of the fly, his dead body rebounds toward the center, rather than bounding over the rim and down into the room. Upon falling through the electrodes, the dead bodies are received in the V-shaped, removable collection tray which is periodically removed and from which air currents cannot disperse the fragments into the air of the room, even when adjacent an air conditioning port.

DESCRIPTION OF THE PREFERRED EMBODIMENT

Figure 1:
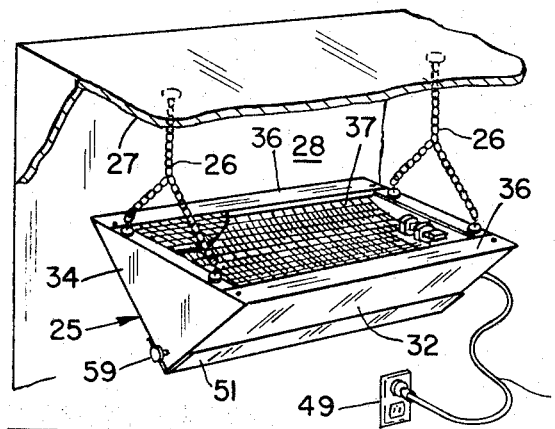
FIG. 1 is a fragmentary perspective view showing the electric fly killer of the invention suspended near the ceiling of a room.
Figure 2:
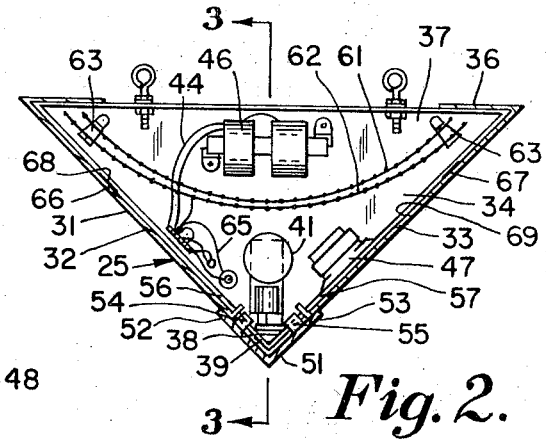
FIG. 2 is an end elevation of the device, in section on line 2—2 of FIG. 3.
Figure 3:
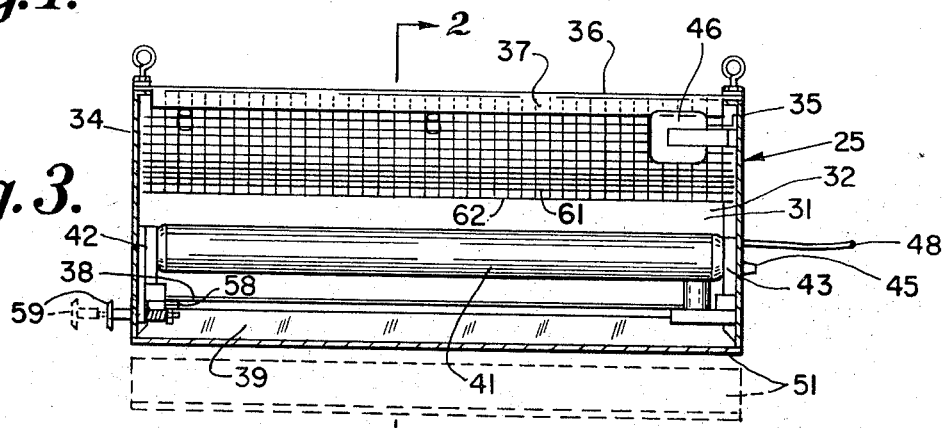
FIG. 3 is a side elevation of the device, in section on line 3—3 of FIG. 2.
Figure 4:
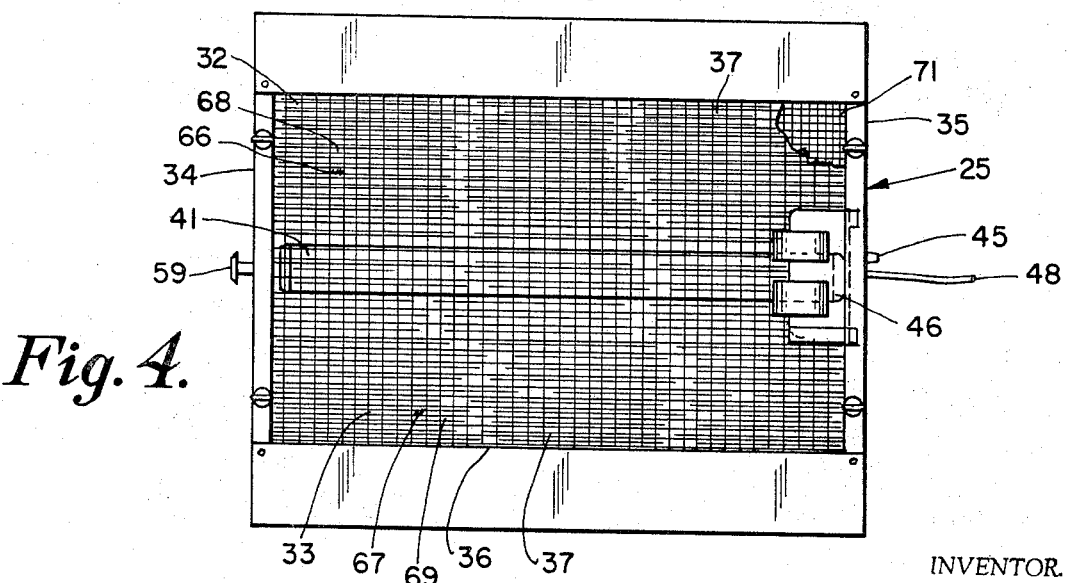
FIG. 4 is a plan view of the device.

As shown in the drawing, the electric fly killer 25 of the invention includes suitable members 26 by which it may be suspended proximate the ceiling 27 of a room 28. As explained above, the device is not only up out of the reach of children and pets, so that inadvertent touching is avoided, but it is also near the warm upper part of the room to which flies rise at night and where they tend to alight during the daytime. It will be obvious that many of the devices of the prior art which are so bulky as to be struck by an occupant of the room, if ceiling suspended, or which permit dead insects to fall indiscriminately, would be useless and objectionable if sought to be hung up out of the way as illustrated. Similarly, if messy, sticky lures or dangerous poison chemicals were the attractant, they would be equally objectionable and dangerous if used in a ceiling suspended device, especially in a restaurant.

The electric fly killer 25 includes an elongated, trough-like collection receptacle 31 having oppositely disposed, inclined side walls 32 and 33, and oppositely disposed end walls 34 and 35 which define an elongated, wide, upper, horizontal rim 36 and opening 37 and an elongated, narrow, lower, horizontal rim 38 and opening 39.

A black fluorescent tube 41 extends longitudinally between sockets 42 and 43 on end walls 34 and 35, proximate the bottom of the receptacle 31 and is connected by conductors 44 to switch 45, transformer 46, ballast 47, cord 48 and a source of current 49, all in a well known manner for energizing the tube.

A trough-like collection tray 51 of V cross section forms a cover, or closure, on bottom opening 39 to receive the dead flies and prevent the fragments thereof from falling on the patrons, or tables and chairs of a dining room, or other habitation. Tray 51 includes inclined side walls 52 and 53 having a pair of catches 54 and 55 at one end slidably fitting over the flanges 56 and 57 of the adjacent end wall 35 and having a cross bar 58 at the opposite end latchable on the spring biased pull knob 59. Thus a pull-on knob 59 releases the end of the tray, and a pull releases the other end for disposal of the flies collected therein.

A pair of spaced apart, concaved electrode grids 61 and 62 are mounted on suitable insulative posts 63 to extend across the receptacle 31 with the center line thereof at a spaced distance above the tube 41 and bottom opening 39 and at a spaced distance below the level of the upper rim 36 and upper opening 37. The outer, or top, grid 61 is grounded and the lower grid 62 is connected by conductor 65 to switch 45 so that the grids are energized when the tube 41 is energized. Preferably the grids 61 and 62 are parabolic in cross section so that, regardless of the incoming flight path of the fly, upon his electrocution and disintegration or if stunned, the fly or fragments will tend to rebound toward the center of the receptacle and will not tend to rebound or escape outside and over the rim 36.

A fluorescent coating, or layer, 66 and 67 is applied to each inner, inclined face 68 and 69 of the side walls 32 and 33 and the tube 41 is so positioned that it causes a varying intensity of re-radiation along the fluorescing surfaces 66 and 67 which attracts the flies with a gentle, soft light, while serving as a low drain night light.

Preferably a flat, horizontal, meshed screen, or cover, 71 is affixed over the wide opening 37 to permit files to see the gentle re-radiated light and to enter, but to intercept any stunned flies and bounce them back for electrocution between the grids to fall into the tray.

The attractant used in the electric fly killer of the invention consists of a source of light wave length necessary to supply the quantum energy to cause the fluorescing of a fluorescable surface. This surface consists of the large area of the coatings 66 and 67 placed within the proximity of the tube 41 as the light source. Upon exposure to the light from tube 41, at approximately 3,650 A, the surfaces 66 and 67 re-radiate a homogeneous soft light, the color being a function of the surface material used. This is termed secondary radiation. In effect, this is how the common fluorescent tube operates, when an electric current passes through the mercury vapor, and reradiates the fluorescent coating on the inside of the tube.

It has been found by experiment that the surfaces 66 and 67, when re-radiated by the 3,650 A source 41 produces an attraction for the house fly far in excess of the attraction produced by the tube 41 itself. This is probably due to the compund eye of the fly and its ability to respond to a large, homogeneous light source of low intensity rather than to a source of high intensity, such as a point or tube, such high intensity causing visual blockage and an inability of the fly to determine its origin.

The ultra violet range of the electro magnetic spectrum from 2,000 – 4,000 Angstrom units is known to have a germicidal and health-giving effect as well as a fluorescent effect so that the device of the invention is useful within a room for purposes other than fly killing. It does not generate infra red light to heat, or dry out the moisture in, a room.

The coated surfaces 66 and 67 may be any commercially available fluorescent paint such as "Day Glo" or the like, or may be fluorescent phosphor crystals as used on the inside face of a conventional fluorescent tube.

I claim:

1. An electric fly killer comprising:
    a collection trough, adapted to be suspended, said trough having a pair of inclined side walls and a pair of end walls, said walls defining an upper horizontal rim around an elongated wide opening and a lower horizontal rim around an elongated narrow opening;
    a black fluorescent tube extending between said end walls, proximate the level of said narrow opening;
    a pair of spaced apart, concave grid electrodes, of generally parabolic configuration, extending across said trough at a spaced distance above said tube and above said narrow opening, with the center thereof spaced below said wide opening;
    a fluorescent coating on the inside, inclined faces of said side walls, energizable by said tube to re-radiate a soft light as secondary radiation;
    a collection tray removably attached to said trough, and closing said narrow opening; and
    means for connecting said tube and electrodes to a source of electric energy.

2. In an electric fly killer, the combination of:
    an elongated, V-shaped trough having inclined side walls and having an elongated narrow opening in the bottom thereof closed by a removable collection tray;
    a black fluorescent tube extending longitudinally along the bottom of said trough;
    a pair of spaced-apart, concave, electrode grids extending across said trough; and
    a fluorescent coating on said inclined side walls;
    said coating re-radiating light from said tube, when said tube is energized, to attract flies for electrocution in said grids and for falling into said receptacle.

3. An electric fly killer as specified in claim 2, wherein:
    said electrode grids are of generally parabolic configuration to prevent the rebounding of flies, electrocuted thereon, outside of said trough.

4. An electric fly killer as specified in claim 2, plus:
    a flat screen extending horizontally across the top of said trough, for admitting live flies, but tending to retain electrocuted dead flies in said trough.

5. An electric fly killer of the type mounted near the ceiling of a room and having a pair of spaced electrode grids extending over a slidable collection tray, said fly killer characterized by:
    a trough-like body having inclined side walls defining a wide upper opening, said grids being of concaved configuration and supported across said body at a spaced distance below said opening;
    and an attractant within said body, said attractant comprising a fluorescent tube below said concaved grids and a fluorescable coating on the inner faces of said side walls;
    said coating re-radiating a soft, low intensity light upwardly through said grids and opening, received from said tube, for attracting flies.

6. A method for killing flies inside a room by means of an electric fly killer having a pair of electrode grids and a black fluorescent tube in a trough, said method comprising the steps of:
    suspending said fly killer just below the ceiling of said room with said trough, grids and tube extending horizontally and exposed to view from directly above the same;
    energizing said tube and grids, and re-radiating the light from said tube upwardly from the side walls of said trough toward said ceiling as a soft light;
    passing said insects downwardly without impact, or deflection, into the space between said electrodes for electrocution therein; and
    collecting the flies attracted down from said ceiling by said re-radiation and electrocuted by said grids, in the bottom of said trough.

7. A method as specified in claim 6, which includes the step of:
    providing said electrode grids in parabolic configuration and rebounding any dead bodies of said flies electrocuted in said grids upwardly toward the center of said parabolic grids and trough, rather than toward the outside of said trough.

* * * * *